US011739701B2

(12) United States Patent
Panciroli

(10) Patent No.: US 11,739,701 B2
(45) Date of Patent: Aug. 29, 2023

(54) METHOD TO DETERMINE THE MASS OF AIR TRAPPED IN EACH CYLINDER OF AN INTERNAL COMBUSTION ENGINE

(71) Applicant: MARELLI EUROPE S.p.A., Corbetta (IT)

(72) Inventor: Marco Panciroli, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/674,211

(22) Filed: Nov. 5, 2019

(65) Prior Publication Data

US 2020/0149481 A1 May 14, 2020

(30) Foreign Application Priority Data

Nov. 8, 2018 (IT) .................. 102018000010164

(51) Int. Cl.
*F02D 13/02* (2006.01)
*F02M 26/17* (2016.01)
(Continued)

(52) U.S. Cl.
CPC ..... *F02D 13/0215* (2013.01); *F02D 13/0261* (2013.01); *F02D 41/0007* (2013.01);
(Continued)

(58) Field of Classification Search
CPC ... F02D 13/0203–0257; F02D 13/0261; F02D 41/0007; F02D 41/0062;
(Continued)

(56) References Cited

U.S. PATENT DOCUMENTS 4,549,398 A * 10/1985 Oishi ................. F01N 9/002
60/303
5,974,870 A * 11/1999 Treinies ............. F02M 26/48
73/114.33
(Continued)

FOREIGN PATENT DOCUMENTS

DE 10344709 A1 * 6/2005 ............. F02D 41/18
DE 102008032935 A1 * 1/2010 ........... F02D 35/023
(Continued)

OTHER PUBLICATIONS

Search Report for Italian Patent Application No. 201800010164 dated Jun. 18, 2019.
(Continued)

*Primary Examiner* — John M Zaleskas
(74) *Attorney, Agent, or Firm* — Howard & Howard Attorneys PLLC

(57) ABSTRACT

A method to determine the mass of air trapped in each cylinder of an internal combustion engine, which comprises determining, based on a model using measured and/or estimated physical quantities, a value for a first group of reference quantities; determining, based on the model, the actual inner volume of each cylinder as a function of the speed of rotation of the internal combustion engine and of the closing delay angle of the intake valve; and calculating the mass of air trapped in each cylinder as a function of the first group of reference quantities and of the actual inner volume of each cylinder.

20 Claims, 3 Drawing Sheets

(51) Int. Cl.
  *F02M 26/47* (2016.01)
  *F02D 41/00* (2006.01)
  *F02D 41/14* (2006.01)
  *F02M 35/10* (2006.01)

(52) U.S. Cl.
  CPC ....... *F02D 41/009* (2013.01); *F02D 41/0062* (2013.01); *F02D 41/1401* (2013.01); *F02M 26/17* (2016.02); *F02M 26/47* (2016.02); *F02M 35/10222* (2013.01); *F02D 2041/001* (2013.01); *F02D 2041/1433* (2013.01); *F02D 2200/024* (2013.01); *F02D 2200/0406* (2013.01); *F02D 2200/0414* (2013.01); *F02D 2200/101* (2013.01)

(58) Field of Classification Search
  CPC .......... F02D 41/0072; F02D 2041/001; F02D 2041/1433; F02D 2200/0406; F02D 2200/0414; F02D 2200/101; F02M 26/01
  See application file for complete search history.

(56) References Cited

U.S. PATENT DOCUMENTS

| | | | | |
|---|---|---|---|---|
| 6,827,051 B2* | 12/2004 | Kawaski | ............... | F01L 9/04 123/90.15 |
| 6,920,863 B1* | 7/2005 | Aono | ............... | F02D 41/18 123/319 |
| 9,109,522 B2 | 8/2015 | Bresch-Pietri et al. | | |
| 2002/0011101 A1* | 1/2002 | Hartke | ............... | F02M 26/01 73/114.78 |
| 2004/0007194 A1* | 1/2004 | Iizuka | ............... | F02D 13/0211 123/90.15 |
| 2004/0015287 A1* | 1/2004 | Iizuka | ............... | F02D 35/023 701/102 |
| 2004/0065303 A1* | 4/2004 | Russell | ............... | G01F 1/363 123/480 |
| 2004/0089061 A1* | 5/2004 | Matsunaga | ........ | F02D 41/0072 73/114.76 |
| 2004/0093148 A1* | 5/2004 | Buckland | ........... | F02D 41/0062 701/102 |
| 2004/0220718 A1* | 11/2004 | Uchida | ............... | F02D 41/0062 701/108 |
| 2004/0230364 A1* | 11/2004 | Uchida | ............... | F02D 41/0062 701/101 |
| 2005/0065707 A1* | 3/2005 | Kaga | ............... | F02D 41/182 701/103 |
| 2005/0066947 A1* | 3/2005 | Barba | ............... | F02D 13/0261 123/568.16 |
| 2005/0178361 A1* | 8/2005 | Abe | ............... | F02D 41/1406 123/432 |
| 2005/0229909 A1* | 10/2005 | Nakazawa | .......... | F02D 41/0062 123/568.14 |
| 2005/0251317 A1* | 11/2005 | Tanaka | ............... | F01L 1/34 701/102 |
| 2006/0054134 A1* | 3/2006 | Henn | ............... | F02D 13/0249 123/325 |
| 2006/0075996 A1* | 4/2006 | Yoshino | ............... | F01L 1/344 123/568.14 |
| 2006/0235603 A1* | 10/2006 | Kobayashi | .......... | F02D 41/0072 701/108 |
| 2007/0113827 A1* | 5/2007 | Moriya | ............... | F02D 13/0203 123/435 |
| 2007/0208489 A1* | 9/2007 | Borean | ............... | F02D 41/18 701/103 |
| 2008/0201056 A1* | 8/2008 | Moriya | ............... | F02D 41/182 701/103 |
| 2008/0319633 A1* | 12/2008 | Moriya | ............... | F02D 37/02 701/103 |
| 2012/0022763 A1* | 1/2012 | Tonetti | ............... | F01L 9/025 701/102 |
| 2012/0291534 A1* | 11/2012 | Wang | ............... | F02D 41/0002 73/114.52 |
| 2013/0131964 A1 | 5/2013 | Leroy et al. | | |
| 2013/0158834 A1* | 6/2013 | Wagner | ............... | F02D 41/0062 701/102 |
| 2014/0007855 A1* | 1/2014 | Kosaka | ............... | F02D 41/0062 123/568.21 |
| 2014/0172278 A1* | 6/2014 | Kosaka | ............... | F02D 41/0062 701/108 |
| 2014/0257673 A1* | 9/2014 | Naik | ............... | F02D 41/30 701/104 |
| 2014/0338636 A1* | 11/2014 | Irie | ............... | F02D 41/2454 123/436 |
| 2014/0373814 A1* | 12/2014 | Herold | ............... | F02B 75/282 123/51 B |
| 2017/0030273 A1* | 2/2017 | Jin | ............... | F02D 41/0062 |
| 2017/0218864 A1* | 8/2017 | Katsuura | ............ | F02D 41/0062 |
| 2017/0248093 A1 | 8/2017 | Meldrum et al. | | |
| 2019/0017449 A1* | 1/2019 | Millich | ............... | F02D 41/0062 |
| 2019/0085777 A1* | 3/2019 | Won | ............... | F02D 41/0062 |

FOREIGN PATENT DOCUMENTS

| | | | | |
|---|---|---|---|---|
| EP | 2594768 A1 | 5/2013 | | |
| FR | 2835281 A1 * | 8/2003 | .......... | F02D 41/182 |

OTHER PUBLICATIONS

Leroy, T., et al., "Modeling Fresh Air Charge and Residual Gas Fraction on a Dual Independent Variable Valve Timing SI Engine," SAE Int. J. Engines, vol. 1, No. 1, pp. 627-635 (Apr. 14, 2008).

Stotsky, Alexander, et al., "Application of input estimation techniques to charge estimation and control in automotive engines," Control Engineering Practice, vol. 10, No. 12, pp. 1371-1383 (Dec. 1, 2002).

* cited by examiner

METHOD TO DETERMINE THE MASS OF AIR TRAPPED IN EACH CYLINDER OF AN INTERNAL COMBUSTION ENGINE

CROSS-REFERENCE TO RELATED APPLICATIONS

This Patent application claims priority from Italian Patent Application No. 102018000010164 filed on Nov. 8, 2018, the entire disclosure of which is incorporated herein by reference.

BACKGROUND OF THE INVENTION

1. Field of the Invention

The invention relates to a method to determine the mass of air trapped in each cylinder of an internal combustion engine.

2. Description of the Related Art

As it is known, an internal combustion engine supercharged using a turbocharger supercharging system comprises a number of injectors injecting fuel into respective cylinders, each connected to an intake manifold by at least one respective intake valve and to an exhaust manifold by at least one respective exhaust valve.

The intake manifold receives a gas mixture comprising both exhaust gases and fresh air, i.e. air coming from the outside through an intake duct, which is provided with an air filter for the fresh air flow and is regulated by a throttle valve. Along the intake duct, preferably downstream of the air filter, there is also provided an air flow meter.

The air flow meter is a sensor connected to an electronic control unit and designed to detect the flow rate of fresh air taken in by the internal combustion engine. The flow rate of fresh air taken in by the internal combustion engine is an extremely important parameter for the engine control, in particular to determine the quantity of fuel to be injected into the cylinders so as to obtain a given air/fuel ratio in an exhaust duct downstream of the exhaust manifold. However, the air flow meter typically is a very expensive and fairly delicate component as oil vapours and dust can dirty it, thus altering the reading of the value of the flow rate of fresh air taken in by the internal combustion engine.

SUMMARY OF THE INVENTION

The object of the invention is to provide a method to determine the mass of air trapped in each cylinder of an internal combustion engine, said method being easy and economic to be implemented.

According to the invention, there is provided a method to determine the mass of air trapped in each cylinder of an internal combustion engine as claimed in the appended claims. Other objects, features and advantages of the present invention will be readily appreciated as the same becomes better understood after reading the subsequent description taken in connection with the accompanying drawings.

BRIEF DESCRIPTION OF THE DRAWINGS

The invention will now be described with reference to the accompanying drawings, showing a non-limiting embodiment thereof, wherein.

DETAILED DESCRIPTION OF THE INVENTION

Figure 1:
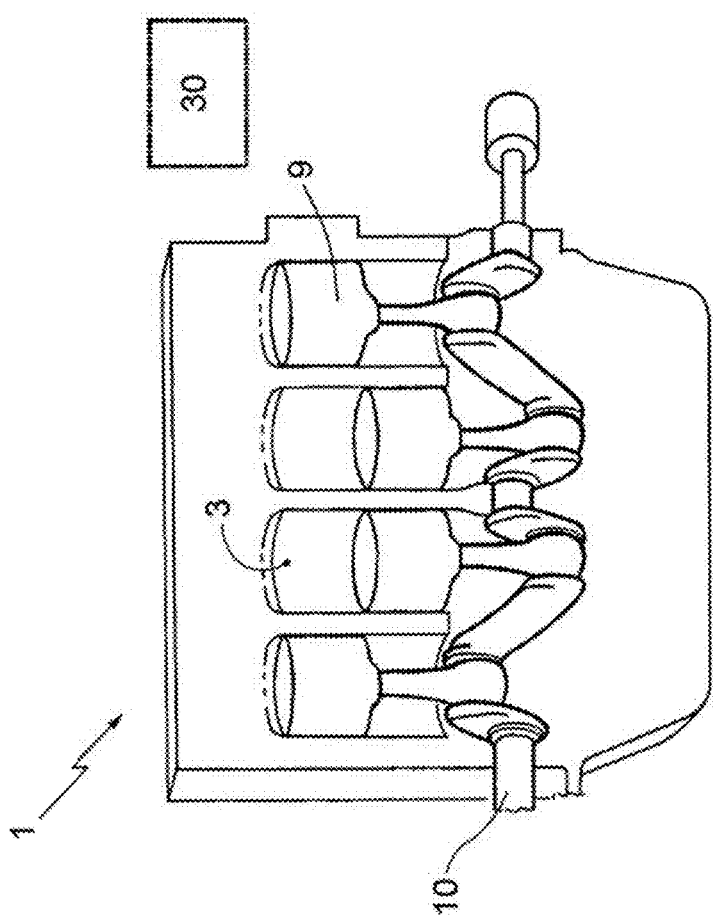
FIG. 1 schematically shows a preferred embodiment of an internal combustion engine provided with an electronic control unit implementing a method according to the invention.
Figure 2:
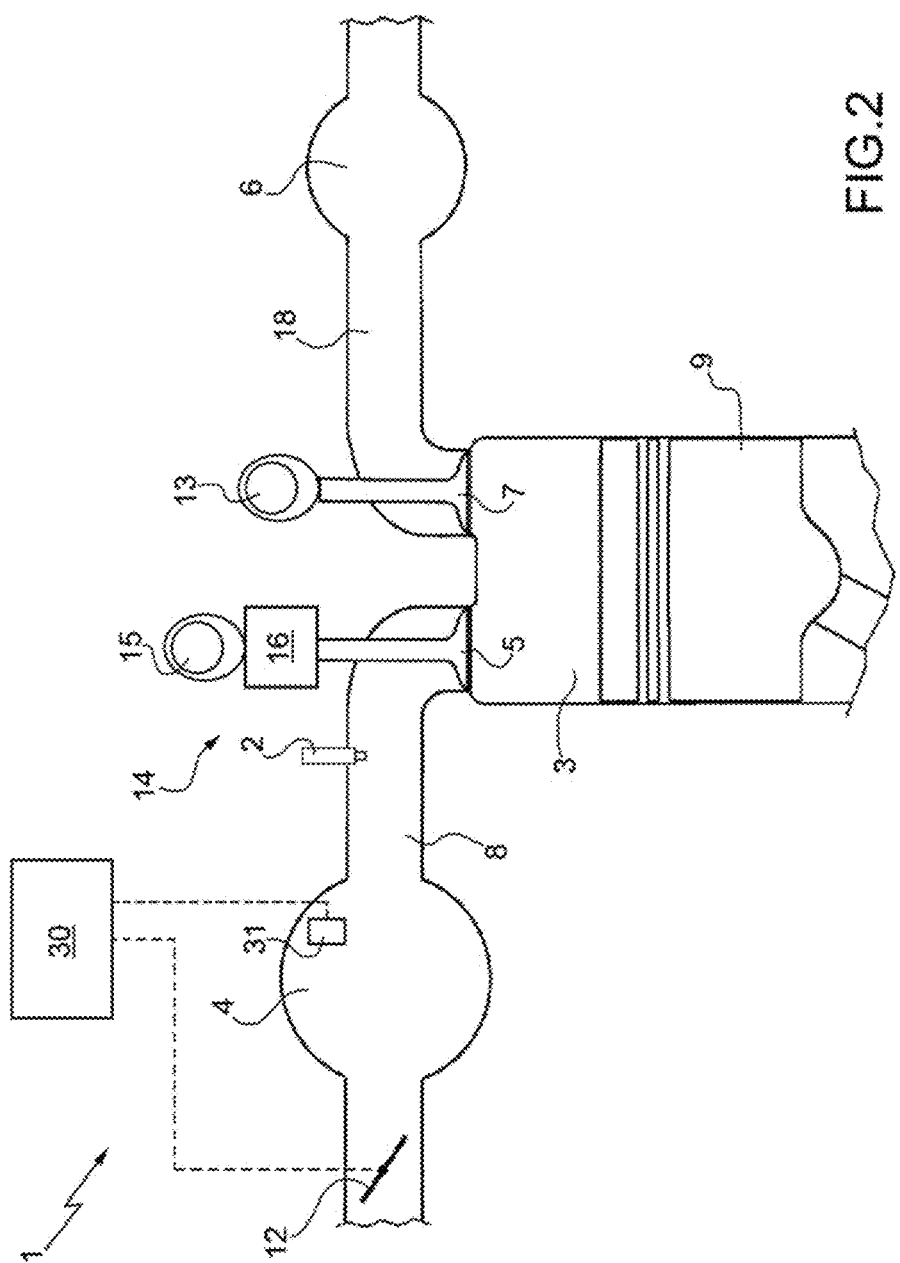
FIG. 2 shows, in detail, a cylinder of the engine of FIG. 1.

In FIGS. 1 and 2, number 1 indicates, as a whole, an internal combustion engine, preferably supercharged using a turbocharger supercharging system.

Figure 3:
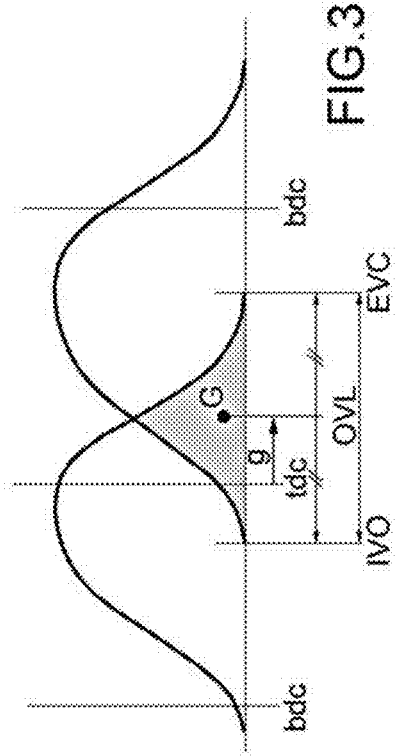
FIGS. 3 and 4 schematically show the overlap phase of an intake valve and of an exhaust valve of the engine of FIG. 1.

The internal combustion engine 1 comprises a number of injectors 2, which directly inject fuel into four cylinders 3 (preferably four cylinders arranged in line), each connected to an intake manifold 4 by at least one respective intake valve 5 (shown in FIG. 3) and to an exhaust manifold 6 by at least one respective exhaust valve 7 (shown in FIG. 2). For each cylinder 3 there is provided a corresponding injector 2; according to the embodiment shown in FIG. 2, the injection is an indirect injection and, therefore, each injector 2 is arranged upstream of the cylinder 3 in an intake duct 8 connecting the intake manifold 4 to the cylinder 3. According to an alternative embodiment which is not shown herein, the injection is a direct injection and, therefore, each injector 2 is partially arranged inside the cylinder 3 through the crown end of the cylinder 3.

According to FIG. 1, each cylinder 3 houses a respective piston 9, which is mechanically connected, by a connecting rod, to a drive shaft 10, so as to transmit to the drive shaft 10 itself, in a known manner, the force generated by the combustion inside the cylinder 3.

The intake manifold 4 receives a gas mixture comprising both exhaust gases (as described more in detail below) and fresh air, i.e. air coming from the outside through the intake duct 8, which is preferably provided with an air filter for the fresh air flow and is regulated by a throttle valve 12, which preferably is an electronically controlled valve and is movable between a closing position and a maximum opening position. Furthermore, no air flow meter is provided along the intake duct 8.

The intake valves 5 and/or the exhaust valves 7 are controlled with a VVT (variable valve timing) device, which hydraulically acts upon the shaft operating the intake valves 5 and or the exhaust valves 7, respectively, changing the inclination thereof relative to a drive shaft.

In particular, the position of each exhaust valve 7 is directly controlled by a cam shaft 13, which receives the motion of the drive shaft 10; similarly, the position of each intake valve 5 is directly controlled by a cam shaft 14, which receives the motion of the drive shaft 10.

Along the intake pipe 8 there is preferably arranged an intercooler, which fulfils the function of cooling the air taken in and is preferably built-in in the intake manifold 4. The exhaust manifold 6 is connected to an exhaust duct 18, which feeds the exhaust gases produced by the combustion to an exhaust system, which releases the gases produced by the combustion into the atmosphere and normally comprises at least one catalytic converter (if necessary, provided with a diesel particulate filter) and at least one silencer arranged downstream of the catalytic converter.

The supercharging system of the internal combustion engine 1 comprises a turbocharger provided with a turbine, which is arranged along the exhaust duct 18 so as to rotate at a high speed due to the action of the exhaust gases expelled from the cylinders 3, and a compressor, which is arranged along the intake duct 8 and is mechanically connected to the turbine so as to be caused to rotate by the turbine itself in order to increase the pressure of the air present in the feeding duct 8.

The description above explicitly refers to an internal combustion engine 1 supercharged by using a turbocharger. Alternatively, the control method described above can find advantageous application in any supercharged internal combustion engine, for example an engine supercharged by using a dynamic or volumetric compressor.

According to one variant, along the exhaust duct 18 there is provided a bypass duct, which is connected in parallel to the turbine so as to have its ends connected upstream and downstream of the turbine itself.

The internal combustion engine 1 advantageously comprises, furthermore, a high-pressure exhaust gas recirculation circuit $EGR_{HP}$, which comprises, in turn, a bypass duct connected in parallel to the assembly consisting of the four cylinders 3, the intake manifold 4 and the exhaust manifold 6. Along the bypass duct there is provided an EGR valve, which is designed to adjust the flow rate of the exhaust gases flowing through the bypass duct and is controlled by an electric motor. Along the bypass duct, downstream of the EGR valve, there is provided a heat exchanger, which fulfils the function of cooling the gases flowing out of the exhaust manifold.

Alternatively, along the intake duct 8 there is provided a bypass duct, which is connected in parallel to the compressor so as to have its ends connected upstream and downstream of the compressor itself; along the bypass duct there is provided a valve $P_{off}$, which is designed to adjust the flow rate of the air flowing through the bypass duct and is controlled by an electric actuator.

The internal combustion engine 1 is controlled by an electronic control unit 30, which controls the operation of all the components of the internal combustion engine 1. In particular, the electronic control unit 30 is connected to sensors which measure the temperature $T_o$ and the pressure $P_o$ along the intake duct 8 upstream of the compressor and to sensors which measure the temperature and the pressure along the intake duct 8 upstream of the throttle valve 12 as well as to a sensor 31 which measures the temperature and the pressure of the gas mixture present in the intake manifold 4. Furthermore, the electronic control unit 30 is connected to a sensor which measures the angular position (and, hence, the rotation speed) of the drive shaft 10 and to a sensor (typically a UHEGO or UEGO linear oxygen sensor—which is known and not described in detail) which measures the air/fuel ratio of the exhaust gases upstream of the catalytic converter and, finally, to a sensor which measures the stroke of the intake and/or exhaust valves.

According to one variant, the internal combustion engine 1 finally comprises a low-pressure exhaust gas recirculation circuit $EGR_{LP}$, which comprises, in turn, a bypass duct originating from the exhaust duct 18, preferably downstream of the catalytic converter, and leading into the intake duct 8, upstream of the compressor; the bypass duct is connected in parallel to the turbocharger. Along the bypass duct there is provided an EGR valve, which is designed to adjust the flow rate of the exhaust gases flowing through the bypass duct. Along the bypass duct, upstream of the EGR valve, there is also provided a heat exchanger, which fulfils the function of cooling the gases flowing out of the exhaust manifold 6 and into the compressor.

In the electronic control unit 30 there is stored a calculation model, which is used to determine, among other things, the mass m of air trapped in each cylinder 3 (for each cycle) and the mass $M_{TOT}$ of air taken in by the internal combustion engine 1.

The model includes a plurality of input parameters, among which there are: the number of revolutions (rpm), the pressure value in the intake manifold 4 and other side conditions (such as, for example, the temperature inside the intake manifold 4 and the temperature of the coolant fluid used in the supercharged internal combustion engine 1).

Figure 5:
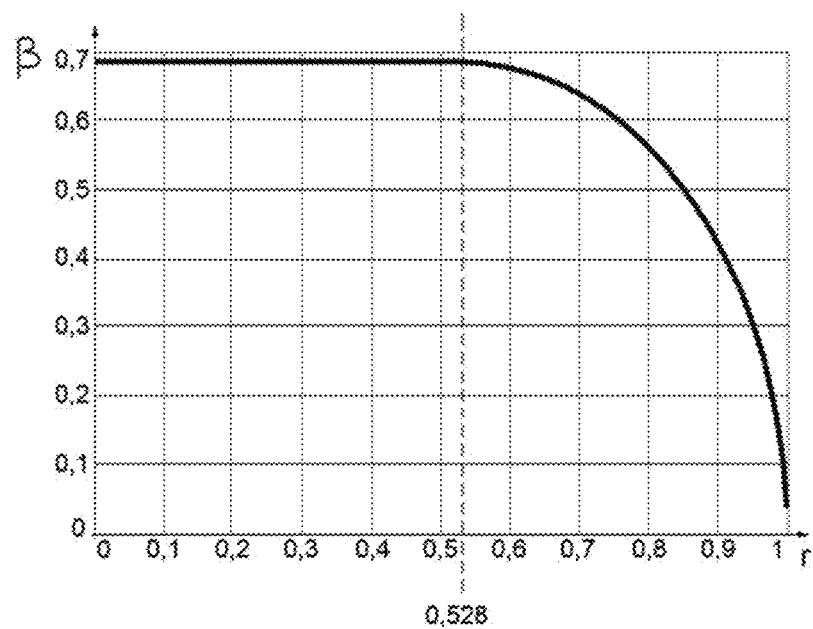
FIG. 5 shows the development of the function $\beta$ used in the method according to the invention.

Since the VVT device varies the timing of the intake valves 5 and the timing of their crossing with the exhaust valves 7 (i.e. the phase during which the intake valve 5 and the exhaust valve 7 are simultaneously open), the model requires to know the following input parameters for each cylinder 3 as well; some parameters are illustrated schematically in FIG. 5 (with respect to the top dead center TDC and the bottom dead center BDC) where:

$IVC_{ref}$ represents the reference closing angle of the intake valve 5;

$IVO_{ref}$ represents the reference opening angle of the intake valve 5;

$EVC_{ref}$ represents the reference closing angle of the exhaust valve 7;

$EVO_{ref}$ represents the reference opening angle of the exhaust valve 7;

IVC represents the closing advance angle of the intake valve 5;

IVO represents the opening advance angle of the intake valve 5;

EVC represents the closing advance angle of the exhaust valve 7; and

EVO represents the opening advance angle of the exhaust valve 7.

Through the input parameters listed above, the following quantities are defined:

$$VVT_I = IVC - IVC_{ref} = IVO - IVO_{ref} \quad [1]$$

$$VVT_E = EVO - EVO_{ref} = EVC - EVC_{ref} \quad [2]$$

$VVT_I$ represents the angular extent of the opening or closing difference relative to the reference values concerning the intake valve 5; and $VVT_E$ represents the angular extent of the opening or closing difference relative to the reference values concerning the exhaust valve 7.

In order to determine the mass m of air trapped in each cylinder 3 for each cycle, the model uses the ideal gas law (known from the literature), according to which $$m = (P*V)/(R*T) \quad [3]$$

where:

P represents the mean of the pressure for the engine cycle inside the intake manifold 4;

T represents the temperature of the mixture of fresh air and/or exhaust gases inside the intake manifold 4;

R represents the constant of the mixture of fresh air and/or exhaust gases; and

V represents the inner volume of the cylinder 3, when the respective intake valve 5 and the respective exhaust valve 7 are closed).

The ideal gas law [3] was experimentally adjusted for the model by incorporating the constant R of the mixture of fresh air and/or exhaust gases, so that the mass m of air trapped in each cylinder 3 for each cycle is expressed as follows:

$$m = P*V*f_1(T,P)*f_2(T_{H2O},P) \quad [4]$$

wherein $T_{H2O}$ is the temperature of the internal combustion engine 1 (preferably expressed through the temperature of the coolant liquid of the internal combustion engine 1).

Parameters P, V, T, on the other hand, have the meaning described above for formula [3].

Finally, the ideal gas law [4] was further experimentally adjusted for the filling model so that the mass m of air trapped in each cylinder 3 for each cycle takes into account the gases produced by the combustion in the previous work cycle and present inside the cylinder 3 (because they did not flow out of the cylinder 3 or because they were re-sucked into the cylinder 3):

$$m = (P*V - \text{OFF})*f_1(T,P)*f_2(T_{H2O},P) \quad [5]$$

wherein OFF is the variable (mass) taking into account the gases produced by the combustion in the previous work cycle and present inside the cylinder 3 (because they did not flow out of the cylinder 3 or because they were re-sucked into the cylinder 3).

Parameters P, V, T, again, have the meaning described above for formula [3].

In reference conditions, in order to calibrate the model, the temperature $T_{H2O}$ of the internal combustion engine 1, namely the temperature of the coolant liquid of the internal combustion engine 1, is assumed to be equal to 90° C. and the temperature T is assumed to be equal to 40° C.

Functions $f_1$ and $f_2$ mentioned above are defined in an experimental phase through (2d) maps as a function, respectively, of the pressure P inside the intake manifold 4 and of the temperature T inside the intake manifold 4 for function $f_1$ and of the pressure P inside the intake manifold 4 and of the temperature $T_{H2O}$ of the internal combustion engine 1 for function $f_2$. It is evident that, in reference conditions (for example, the reference temperature inside the intake manifold 4 is equal to 25° C.), functions $f_1$ and $f_2$ have a unitary value.

The inner volume V of the cylinder is variable 3 (from a geometrical point of view) as a function of the closing advance angle IVC of the respective intake valve 5. Indeed, the actual inner volume V of the cylinder 3 results from the sum of the dead volume $V_{CC}$ of the combustion chamber of the cylinder 3 (i.e. the volume that is not scavenged by the respective piston 9) and of the volume $V_c$ scavenged by the respective piston 9 until the closing of the respective intake valve 5 (i.e. of the angle of rotation of the crank relative to the top dead centre PMS).

Hereinafter you can find the kinematic law (known from the literature and not described in detail) used to calculate the inner volume V of the cylinder 3 in the area of the crank angle indicated with $\alpha$:

$$V(\alpha) = V_{CC} + V_C(\alpha) \quad [6]$$

$$V(\alpha) = V_{CC} + S^*r^*\left[\left(1 + \frac{1}{\lambda}\right) * \sqrt{1 - \frac{\delta}{(1+\lambda)^2}} - \cos\alpha - \frac{1}{\lambda} * \sqrt{1 - (\lambda^* sen\alpha - \delta)^2}\right]$$

where:
V represents the inner volume of the cylinder 3;
$V_{CC}$ represents the dead volume of the combustion chamber of the cylinder 3;

$\alpha$ represents the angle of rotation of the crank relative to the top dead centre PMS;
r represents the crank radius;
S represents the surface area of the piston 9;
L represents the length of the connecting rod;
d represents the offset between the axis of the cylinder 3 and the rotation axis of the drive shaft 10;
$\lambda$ represents the r/L ratio; and
$\delta$ represents the d/L ratio.

According to one variant, generally speaking, the inner volume V of the cylinder 3 is variable as a function of a geometrical factor represented by the closing advance angle IVC of the respective intake valve 5, by a dynamic factor represented by the speed n of rotation of the internal combustion engine 1 (or number of revolutions rpm) and by the pressure P measured for the engine cycle inside the intake manifold 4.

In particular, the law [6] to determine the inner volume V of the cylinder 3 was experimentally adjusted for the model by introducing the two functions $f_v$ and $f_p$ and is expressed as follows:

$$V = f_V(IVC,n) * f_P(P,n) \quad [7]$$

Parameters P, n, IVC have the meaning already discussed above.

Furthermore, it should be taken into account that, at the beginning of the intake stroke of any engine cycle, inside the cylinder 3 there are also the residual gases of the combustion of the previous engine cycle.

From a geometrical point of view, the volume occupied by the residual gases of the combustion of the previous engine cycle can be expressed through the sum of the dead volume $V_{CC}$ of the combustion chamber of the cylinder 3 and of a volume $V_C$ scavenged by the respective piston 9 inside the cylinder 3.

The volume $V_C$ scavenged by the piston 9 inside the cylinder 3 is variable as a function of the parameter TVC, which is better described below.

In particular, according to a first variant, the volume $V_C$ scavenged by the piston 9 inside the cylinder 3 corresponds to the volume scavenged by the piston 9 until the instant in which the respective exhaust valve 7 closes, in case the respective intake valve 5 opens following the closing of the respective exhaust valve 7.

According to a second variant, the volume $V_C$ scavenged by the piston 9 inside the cylinder 3 corresponds to the volume scavenged by the piston 9 until the instant in which the respective intake valve 5 opens, in case the respective exhaust valve 7 closes following the opening of the respective intake valve 5.

According to a third variant, the volume $V_C$ scavenged by the piston inside the cylinder 3 corresponds to the volume scavenged by the piston 9 up to the top dead centre PMS, in case the opening instant of the respective intake valve 5 is prior to said top dead centre PMS. It is evident that, in this case, the volume $V_C$ scavenged by the respective piston inside the cylinder 3 in zero and the inner volume V of the cylinder 3 corresponds to the dead volume $V_{CC}$ of the combustion chamber of the cylinder 3.

In other words, the parameter TVC can alternatively correspond to the closing advance angle EVC of the exhaust valve 7 or to the greatest value between zero and the smallest value between the closing advance angle EVC of the exhaust valve 7 and the opening advance angle IVO of the intake valve 5.

Since the VVT system changes the timing of the intake valves 5 and of their overlap with the exhaust valves 7, the model also allows for a determination of the mass flow rate flowing during the overlap phase between each intake valve 5 and the respective exhaust valve 7. In the description below, the term overlap defines the phase (time interval) in which each intake valve 5 and the respective exhaust valve 7 are simultaneously open.

Figure 4:
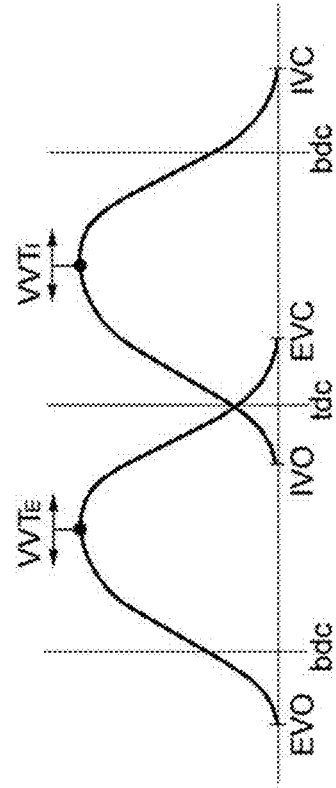

According to what is schematically shown in FIG. 4, the following geometrical quantities are defined (relative to the top dead centre TDC and to the bottom dead centre BDC):

OVL represents the duration of the overlap phase comprised between the closing advance angle EVC of the exhaust valve 7 and the opening advance angle IVO of the intake valve 5;

G represents the centre of gravity of the overlap phase between each intake valve 5 and the respective exhaust valve 7; and g represents the difference between the top dead centre PMS and the centre of gravity G.

Hereinafter the law (known from the literature and not described in detail) used to calculate the mass flow rate through a section of a duct (or through an orifice) can be determined. In this case, the law is used to calculate the mass $M_{OVL}$ flowing from the exhaust to the intake through the intake valve 5 and the exhaust valve 7:

$$M_{OVL} = C_D * A * \frac{P_0}{\sqrt{\frac{R}{T_0}}} * B\left(\frac{P}{P_0}\right) \quad [8]$$

where:
A represents the area of the passage section;
$C_D$ represents the discharge coefficient;
P represents the pressure downstream of the passage section;
$P_0$ represents the pressure at the inlet of the passage section;
$T_0$ represents the temperature at the inlet of the passage section;
R represents the constant of the fluid flowing in the passage section; and
B represents the flow compressibility function expressed by the following equation [8']:

$$B = \frac{2K}{K-1} * \sqrt{\left(\frac{P}{P_0}\right)^{\frac{2}{K}} - \left(\frac{P}{P_0}\right)^{\frac{K+1}{K}}} \quad [8']$$

wherein K represents the ratio between the specific heat $C_p$ at constant pressure and the specific heat $C_v$ at constant volume.

The law [8] is experimentally adjusted for the model by integrating it between the instant $t_1$ in which the overlap phase begins and the instant $t_2$ in which the overlap phase ends according to the equation [9] below:

$$M_{OVL} = \sqrt{\frac{P_0}{R/T_0}} * B\left(\frac{P}{P_0}\right) * \int_{t_1}^{t_2} A_{IS}(t)dt \quad [9]$$

If the variable dt is replaced with dθ/ω (wherein θ represents the engine angle and ω represents the speed of rotation of the internal combustion engine 1), the following equation [10] is obtained:

$$M_{OVL} = \sqrt{\frac{P_0}{R/T_0}} * B\left(\frac{P}{P_0}\right) * \int A_{IS}(\theta) * \frac{1}{\omega}d\theta \quad [10]$$

Finally, assuming that the speed ω of rotation of the internal combustion engine 1 is constant during the overlap phase, equation [10] can be simplified in the following equation [11]:

$$M_{OVL} = \sqrt{\frac{P_0}{R/T_0}} * B\left(\frac{P}{P_0}\right) * \int A_{IS}(\theta)d\theta \quad [11]$$

In the preceding equations $A_{IS}$ represents the isentropic area.

Inside the electronic control unit 30, equation [11] is further experimentally adjusted for the model so as to obtain the mass $M_{OVL}$ as follows:

$$M_{OVL} = S_{id} * \beta\left(\frac{P}{P_0}, n\right) * \frac{P_0}{P_{0\_REF}} * \sqrt{\frac{T_{0\_REF}}{T_0}} * \frac{1}{n} \quad [12]$$

where:
$S_{id}$ represents the ideal section;
n represents the speed of the internal combustion engine (1);
$P_{0\_REF}$ represents the reference pressure upstream of the passage section;
$T_{0\_REF}$ represents the reference temperature upstream of the passage section;
$T_0$ represents the temperature upstream of the passage section;
$P_0$, P represents the pressure upstream and downstream, respectively, of the passage section; and
B represents the compression ratio.

The ideal section $S_{id}$ of the passage is obtained from the product of two functions, wherein the first function A is experimentally determined through the (2d) map variable as a function of the speed n of the internal combustion engine 1 and of the parameter OVL, whereas the second function G is experimentally determined through a (2d) map variable as a function of the speed n of the internal combustion engine 1 and of the parameter g.

The combustion chamber of the cylinder 3 is considered to be a passage section (preferably upstream and downstream of the respective valves 5, 7). In case the intake pressure is greater than the exhaust pressure, the "upstream" pressure and temperature to be taken into account are the pressure and the temperature upstream of the intake valve 5 (and, hence, measured by the sensor present in the intake manifold 4); whereas the "downstream" pressure and temperature to be taken into account are the pressure and the temperature downstream of the exhaust valves 7 and, hence, the pressure and the temperature of the exhaust gases (typically obtained from a model or, if possible, measured using a dedicated sensor).

If the exhaust pressure is greater than the intake pressure, the reverse logic applies; namely, the "downstream" pressure and temperature to be taken into account are the pressure and the temperature upstream of the intake valve 5 (and, hence, measured by the sensor present in the intake manifold 4); whereas the "upstream" pressure and temperature to be taken into account are the pressure and the temperature downstream of the exhaust valves 7 and, hence, the pressure and the temperature of the exhaust gases (typically obtained from a model or, if possible, measured using a dedicated sensor).

In both cases, we are dealing with mean values over the engine cycle, namely over the 720° of rotation of the drive shaft 10.

In case the pressure in the exhaust manifold 6 is greater than the pressure in the intake manifold 4, a portion of the exhaust gases produced by the combustion flows from the combustion chamber towards the intake manifold 4; during the following combustion cycle, the exhaust gas portion will be then reintroduced into the combustion chamber through the intake valve 5. This operating mode is indicated as "inner EGR" and formula [12] is adjusted by replacing the downstream pressure $P_0$ with the exhaust pressure $P_{EXH}$ and by replacing the downstream temperature $T_0$ with the exhaust temperature $T_{EXH}$. Therefore, in this case, the mass $M_{OVL}$ is expressed as follows:

$$M_{OVL} = S_{id} * \beta\left(\frac{P}{P_{EXH}}, n\right) * \frac{P_{EXH}}{P_{0\_REF}} * \sqrt{\frac{T_{0\_REF}}{T_{EXH}}} * \frac{1}{n} \qquad [13]$$

The mass $M_{EGRI}$ of "inner EGR" can be expressed as follows:

$$M_{EGRI} = M_{OVL} + P_{EXH} * V_{CC}/(R * T_{EXH}) \qquad [14]$$

Quantities $M_{OVL}$, $P_{EXH}$, $V_{CC}$, R and $T_{EXH}$ have the meaning already discussed above.

In case the pressure in the intake manifold 4 is greater than the pressure in the exhaust manifold 6, a portion indicated with $M_{SCAV}$ of fresh air inside the intake manifold 4 during the overlap phase is directly directed towards the exhaust manifold 6 through the respective exhaust valve 7, also dragging towards the exhaust manifold 6 a residual flow rate $M_{EXH\_SCAV}$ of exhaust gases present inside the combustion chamber. This phenomenon, on the other hand, is indicated as "scavenging" and formula [12] is adjusted by replacing the downstream pressure $P_0$ with the pressure P of the incoming air (flowing into the intake manifold 4), by replacing the upstream pressure P with the exhaust pressure $P_{EXH}$ and by replacing the downstream pressure $T_0$ with the temperature $T_{AIR}$ of the incoming air (flowing into the intake manifold 4). Therefore, in this case, the mass $M_{OVL}$ is expressed as follows:

$$M_{OVL} = S_{id} * \beta\left(\frac{P_{EXH}}{P}, n\right) * \frac{P}{P_{0\_REF}} * \sqrt{\frac{T_{0\_REF}}{T_{AIR}}} * \frac{1}{n} \qquad [15]$$

The residual flow rate $M_{EXH\_SCAV}$ of exhaust gases present inside the combustion chamber and dragged towards the exhaust manifold 6 can be expressed as follows:

$$M_{EXH\_SCAV} = f_{SCAV}(M_{OVL}, n) * P_{EXH} * V_{CC}/(R * T_{EXH}) \qquad [16]$$

Quantities $M_{OVL}$, n, $P_{EXH}$, $V_{CC}$, R and $T_{EXH}$ have the meaning already discussed above. The function $f_{SCAV}$ is experimentally determined through a (2d) map variable as a function of the speed n of the internal combustion engine 1 and of the mass $M_{OVL}$.

The portion $M_{SCAV}$ of fresh air inside the intake manifold 4 directly directed towards the exhaust manifold 6 through the respective exhaust valve 7 during the overlap phase can hence be expressed as follows:

$$M_{SCAV} = M_{OVL} - M_{EXH\_SCAV} \qquad [17]$$

In other words, the portion $M_{SCAV}$ of fresh air inside the intake manifold 4 directly directed towards the exhaust manifold 6 is equal to the mass $M_{OVL}$ minus the residual flow rate $M_{EXH\_SCAV}$ of exhaust gases present inside the combustion chamber and dragged towards the exhaust manifold 6.

The model is finally suited to determine the variable OFF, which takes into account the gases produced by the combustion in the previous work cycle and present inside the cylinder 3 (because they did not flow out of the cylinder 3 or because they were re-sucked into the cylinder 3). The calculation of the variable OFF changes as a function of the work conditions, in particular as a function of the ratio between the pressure in the intake manifold 4 and the pressure in the exhaust manifold 6.

In case the pressure in the exhaust manifold 6 is greater than the pressure in the intake manifold 4 ("inner EGR" operating mode), the variable OFF corresponds to the total mass $M_{EGRI}$ of "inner EGR" expressed through formula [14].

On the other hand, in case the pressure in the intake manifold 4 is greater than the pressure in the exhaust manifold 6 ("washing" operating mode), the variable OFF is expressed through the following formula [16]:

$$OFF = P_{EXH} * V_{CC}/(R * T_{EXH}) - M_{EXH\_SCAV} \qquad [18]$$

In case the pressure in the intake manifold 4 is greater than the pressure in the exhaust manifold 6, indeed, the gases produced by the combustion in the previous work cycle and present inside the cylinder 3 (because they did not flow out of the cylinder 3) are at least partially directly directed towards the exhaust manifold 6 during the overlap phase through the respective exhaust valve 7. The value assumed by the variable OFF is substantially positive or equal to zero in case the entire flow rate of the gases produced by the combustion in the previous work cycle and present inside the cylinder 3 is directly directed towards the exhaust manifold 6 during the overlap phase; the electronic control unit 30 is configured to saturate the variable OFF to the zero value.

According to a further variant, in case, due to dynamic and cooling effects of the combustion chamber of the cylinder 3, the variable OFF assumes a negative value, the electronic control unit 30 is configured to saturate the variable OFF to a negative value.

According to a further variant, the ideal gas law [5] can be further generalized in the way expressed by formulas [19] and [20] below in order to estimate the mass m of air trapped in the cylinder 3:

$$m = (P * V - OFF) * K_t * K_1(VVT_I, VVT_E) * K_2(VVT_E, n) \qquad [19]$$

$$m = (P * V(IVC, n) * K(P, n) - OFF) * K_t * K_1 * K_2 \qquad [20]$$

where:

$K_t$ represents the product of the previously discussed functions $f_1(T, P)$ and $f_2(T_{H2O}, P)$;

OFF represents the variable (mass) taking into account the gases produced by the combustion in the previous work cycle and present inside the cylinder 3 (because they did not flow out of the cylinder 3 or because they were re-sucked into the cylinder 3);

$K_1(VVT_I, VVT_E)$ is a multiplying coefficient taking into account the angular extent $VVT_I$ of the difference relative to the reference values of the intake valve 5 and the angular extent $VVT_E$ of the difference relative to the reference values of the exhaust valve 7; and $K_2(VVT_E, n)$ is a multiplying coefficient taking into account the angular extent $VVT_E$ of the difference relative to the reference values of the exhaust valve 7 and the speed n of rotation of the internal combustion engine 1 (or number of revolutions rpm).

The law [19] used to obtain the mass m of air trapped in the cylinder 3 is used as model to calculate the quantity of fuel to be injected into the cylinder 3 in order to obtain an objective value of the air/fuel ratio of the exhaust gases. In other words, once the mass m of air trapped in each cylinder 3 for each cycle has been determined through the model, the electronic control unit 30 determines the quantity of fuel to be injected into the cylinder 3 allowing the objective value of the air/fuel ratio of the exhaust gases to be reached.

According to one embodiment, in the electronic control unit 30 there is also stored a calculation chain which, from the request for torque made by the user by acting upon the accelerator pedal, is capable of providing the mass $m_{obj}$ of combustion air needed by each cylinder 3 to fulfil the torque request. The calculation chain requires the user to act upon the accelerator pedal, thus determining, through maps stored in the electronic control unit 30 and knowing the speed n of rotation of the internal combustion engine 1 (or number of revolutions), the torque $C_r$ requested to the drive shaft 10; the torque $C_r$ requested to the drive shaft 10 is then preferably added to the pumping torques and to the torques of the auxiliary elements so as to obtain the total torque $C_t$ requested to the drive shaft 10; then the torque $C_t^*$ requested for each cylinder 3 is calculated. Once the torque $C_t^*$ requested for each cylinder 3 has been determined, the calculation chain determines the mass $m_{obj}$ of combustion air needed by each cylinder 3 to obtain said torque value $C_t^*$.

Once the mass $m_{obj}$ of combustion air needed by each cylinder 3 to obtain said torque value $C_t^*$ has been obtained, the electronic control unit 30 is designed to use law [19] or [20] of the model in a reverse manner relative to what discussed above. In other words, for a given value of the mass $m_{obj}$ of combustion air needed by each cylinder 3 (which, in this case, corresponds to the mass m of air trapped in each cylinder 3 for each cycle in formula [19] or [20]), law [19] or [20] is used to calculate the objective pressure value $P_{OBJ}$ inside the intake manifold 4. In particular, by replacing the mass m of air trapped in each cylinder 3 for each cycle with the mass $m_{obj}$ of combustion air needed by each cylinder 3 and by replacing the mean P of the pressure for the engine cycle inside the intake manifold 4 with the objective pressure value $P_{OBJ}$ inside the intake manifold 4 in formula [20], the following law [21] is obtained:

$$P_{OBJ}=[m_{obj}/(K_t^*K_1^*K_2)+\text{OFF}]/(V(\text{IVC},n)^*K(P,n)) \quad [21]$$

The throttle valve 12 is controlled by the electronic control unit 30 so as to obtain, inside the intake manifold 4, the objective pressure value $P_{OBJ}$ determined through law [21].

The model stored inside the electronic control unit 30 uses measured and/or estimated physical quantities (such as, for example, the temperature and pressure values) and measured and/or objective physical quantities (such as, for example, the VVT timing of the intake valves 5 and of their overlap with the exhaust valves 7).

In case the internal combustion engine 1 comprises the low-pressure exhaust gas recirculation circuit $EGR_{LP}$, the total mass $M_{EGR\_TOT}$ recirculated through the low-pressure circuit $EGR_{LP}$ is calculated through formula [8], which was discussed in the description above.

On the other hand, the mass $M_{EGR}$ recirculated through the low-pressure circuit $EGR_{LP}$ for each cylinder 3 is calculated through the following formula:

$$M_{EGR}=M_{EGR\_TOT}/(n^*120^*N_{CYL}) \quad [22]$$

where:

n represents the speed of rotation of the internal combustion engine 1 (or number of revolutions rpm);

$N_{CYL}$ represents the number of cylinders 3; and $M_{EGR\_TO}$ represents the total mass recirculated through the low-pressure circuit $EGR_{LP}$ calculated by the electronic control unit 30 with a model or, alternatively, measured using a dedicated sensor.

$M_{EGR}$ represents the mass recirculated through the low-pressure circuit $EGR_{LP}$ for each cylinder 3.

Hence, laws [19] and [20] can be further generalized as follows in order to also take into account the mass $M_{EGR}$ recirculated through the low-pressure circuit $EGR_{LP}$:

$$m=(P^*V-\text{OFF})^*K_t^*K_1^*K_2-M_{EGR} \quad [23]$$

$$m=(P^*V(\text{IVC},n)^*K(P,n)-\text{OFF})^*K_t^*K_1^*K_2-M_{EGR} \quad [24]$$

where:

$K_t$ represents the product of the previously discussed functions $f_1(T, P)$ and $f_2(T_{H2O}, P)$;

OFF represents the variable (mass) taking into account the gases produced by the combustion in the previous work cycle and present inside the cylinder 3 (because they did not flow out of the cylinder 3 or because they were re-sucked into the cylinder 3);

$M_{EGR}$ represents the mass recirculated through the EGR circuit for each cylinder 3; and $K_1$ $K_2$ are the empirical multiplying coefficients taking into account the angular extent $VVT_I$ of the difference relative to the reference values of the intake valve 5, the angular extent $VVT_E$ of the difference relative to the reference values of the exhaust valve 7 and the speed n of rotation of the internal combustion engine 1 (or number of revolutions rpm).

The description above, which deals with the calculation of the mass $M_{EGR}$ recirculated through the low-pressure circuit $EGR_{LP}$ for each cylinder 3, can also be applied, in an equivalent manner, in case of a high-pressure exhaust gas recirculation circuit $EGR_{HP}$.

Finally, the total mass $M_{TOT}$ of air taken in by the internal combustion engine 1 is calculated through the following formula:

$$M_{TOT}=(m+M_{SCAV}+M_{EXH\_SCAV})^*N_{CYL} \quad [23]$$

where:

$M_{TOT}$ represents the total mass of air taken in by the internal combustion engine 1;

m represents the mass of air trapped in each cylinder 3;

$M_{SCAV}$ represents the portion of fresh air inside the intake manifold 4 directly directed towards the exhaust manifold 6 for each cylinder 3 through the respective exhaust valve 7 during the overlap phase and obtained using formula [17];

$M_{EXH\_SCAV}$ represents the mass of exhaust gases present in the cylinder 3 from the previous cycle and expelled, upon exhaust, by the scavenging flow; and $N_{CYL}$ represents the number of cylinders 3.

On the other hand, the mass of gases OFF produced by the combustion in the previous work cycle and present inside the cylinder 3, in case the pressure of the intake manifold 4 is greater than the pressure in the exhaust manifold 6, is calculated through the following equation:

$$\text{OFF}=P_{EXH}^*V_{CC}/(R^*T_{EXH})-M_{EXH\_SCAV}$$

where:

$P_{EXH}$ represents the pressure of the gas flow in the exhaust;

$T_{EXH}$ represents the temperature of the gas flow in the exhaust;

$V_{CC}$ represents the dead volume of the combustion chamber of the cylinder 3;

$M_{EXH\_SCAV}$ represents the residual mass of exhaust gases present inside the combustion chamber of the cylinder 3 and directly directed towards the exhaust manifold 6 through the respective exhaust valve 7; and R represents the constant of the mixture of fresh air and/or exhaust gases.

If the internal combustion engine 1 comprises a low-pressure gas recirculation circuit, the method comprises the further steps of calculating a quantity $R_{EGR}$ indicating the incidence of a low-pressure circuit on the gas mixture flowing in the intake duct 6:

$$R_{EGR}=M_{EGR\_LP}/M_{TOT}$$

where:

$M_{TOT}$ represents the mass of the gas mixture flowing through the intake duct 6;

$M_{EGR\_LP}$ represents the mass of exhaust gases recirculated through the low-pressure circuit which flows in the intake duct 6; and calculating the mass of gases OFF produced by the combustion in the previous work cycle and present inside the cylinder 3 using the following equation:

$$OFF=P_{EXH}*V_{CC}/(R*T_{EXH})-M_{EXH\_SCAV}*(1-R_{EGR})$$

The mass of gases OFF produced by the combustion in the previous work cycle and present inside the cylinder 3 is caused to be equal to zero (is saturated), in case the entire flow rate of gases produced by the combustion in the previous work cycle and present inside the cylinder 3 is directly directed towards the exhaust manifold 6 during the overlap phase through the respective exhaust valve 7.

On the other hand, the residual mass $M_{EXH\_SCAV}$ of exhaust gases is calculated as a function of the mass $M_{OVL}$ flowing from the intake to the exhaust through the intake valve 5 and the exhaust valve 7. The residual mass $M_{EXH\_SCAV}$ of exhaust gases is calculated as a function of the speed n of rotation of the internal combustion engine 1. The residual mass $M_{EXH\_SCAV}$ of exhaust gases is advantageously calculated as a function of the pressure $P_{EXH}$ and of the temperature $T_{EXH}$ of the gas flow in the exhaust and of the dead volume $V_{CC}$ of the combustion chamber of the cylinder 3.

The residual mass $M_{EXH\_SCAV}$ of exhaust gases is, in particular, calculated using the following equation:

$$M_{EXH\_SCAV}=f(M_{OVL},n)*P_{EXH}*V_{CC}/(R*T_{EXH}) \quad [14]$$

where:

$P_{EXH}$, $T_{EXH}$ represent the pressure and temperature of the gas flow in the exhaust;

$V_{CC}$ represents the dead volume of the combustion chamber of the cylinder 3;

n represents the speed of rotation of the internal combustion engine 1; and $M_{OVL}$ represents the mass flowing from the exhaust to the intake and sucked again into the cylinder 3, during the intake stroke, through the intake valve 5.

The residual mass $M_{EXH\_SCAV}$ of exhaust gases is calculated using the following equation:

$$M_{EXH\_SCAV}=M_{OVL}*f(M_{OVL},n)*g_1(G,n)$$

where:

n represents the speed of rotation of the internal combustion engine 1;

$M_{OVL}$ represents the mass flowing from the intake to the exhaust through the intake valve 5 and the exhaust valve 7; and G represents the centre of gravity of the overlap phase.

Function $g_1$ is defined in an experimental phase through a (2d) map as a function of the speed n of rotation of the internal combustion engine 1 and of the centre G of gravity of the overlap phase, respectively.

The mass $M_{OVL}$ is determined using the following equation:

$$M_{OVL} = S_{id} * \beta\left(\frac{P}{P_0}, n\right) * \frac{P_0}{P_{0\_REF}} * \sqrt{\frac{T_{0\_REF}}{T_0}} * \frac{1}{n}$$

where:

$S_{id}$ represents the ideal section;

n represents the speed of the internal combustion engine (1);

$P_{0\_REF}$ represents the reference pressure upstream of the passage section (or overlap);

$T_{0\_REF}$ represents the reference temperature upstream of the passage section (or overlap);

$T_0$ represents the temperature upstream of the passage section (or overlap); and $P_0$, P represent the pressure upstream and downstream, respectively, of the passage section (or overlap).

The development of function $\beta$ is shown in FIG. 5 as a function of the compressibility factor $P/P_0$. Function $\beta$ is experimentally characterized as a function of the speed n of the internal combustion engine 1.

The ideal section S is calculated as the product between a first function A of the speed n of the internal combustion engine 1 and of the duration OVL of the overlap phase, during which each intake valve 5 and the respective exhaust valve 7 are simultaneously open, and a second function G of the speed n of the internal combustion engine 1 and of the angular difference between the top dead centre PMS and the centre of gravity G of the overlap phase.

The mass (m) of air trapped in each cylinder 3 is further calculated as a function of a number of (two) multiplying coefficients $K_1$, $K_2$, which take into account the angular extent $VVT_I$ of a difference relative to the reference values of the intake valve 5, the angular extent $VVT_E$ of a difference relative to the reference values of the exhaust valve 7 and the speed n of rotation of the internal combustion engine 1.

In one embodiment, the mass m of air trapped in each cylinder 3 is calculated as a function of a first multiplying coefficient $K_1$, which takes into account the angular extent $VVT_I$ of a difference relative to the reference values of the intake valve 5 and the angular extent $VVT_E$ of a difference relative to the reference values of the exhaust valve 7, and of a second multiplying coefficient $K_2$, which takes into account the speed n of rotation of the internal combustion engine 1 and the angular extent $VVT_E$ of a difference relative to the reference values of the exhaust valve 7.

In case the internal combustion engine 1 further comprises the exhaust gas recirculation circuit $EGR_{LP}$, $EGR_{LP}$, the method involves determining the mass m of air trapped in each cylinder 3 also as a function of a mass $M_{EGR}$ recirculated through the circuit $EGR_{LP}$, $EGR_{LP}$ for each cylinder 3.

Hence, the mass m of air trapped in each cylinder 3 is calculated using the following formula:

$$m=(P*V-\text{OFF})*f_1(T,P)*f_2(T_{H2O},P)*-M_{EGR} \quad [22]$$

where:

$f_1$ $f_2$ are functions taking into account the temperature T inside the intake manifold 4, the intake pressure P and the temperature $T_{H2O}$ of the coolant fluid of the internal combustion engine 1;

OFF represents the mass of gases produced by the combustion in the previous work cycle and present inside the cylinder 3; and $M_{EGR}$ represents the mass recirculated through the EGR circuit for each cylinder 3.

The dead volume $V_{CC}$ of the combustion chamber of the cylinder 3 is a function of the speed n of rotation of the internal combustion engine 1 and of a first parameter TVC, which is alternatively equal to the closing delay angle EVC of the exhaust valve 7 or to the greatest value between zero and the smallest value between the closing delay angle EVC of the exhaust valve 7 and the value of the opening advance angle IVO of the intake valve 5 multiplied by −1. The volume is determined using a map, which is a function of the speed of rotation n of the internal combustion engine 1 and of the first parameter TVC, and using a map, which is a function of the speed n of rotation of the internal combustion engine 1 and of the duration OVL of the overlap phase.

The method further comprises determining, based on a calculation model using measured and/or estimated physical quantities, the mass $m_{obj}$ of combustion air needed by each cylinder 3 in order to fulfil the torque request $C_t^*$; and determining the objective pressure value $P_{OBJ}$ inside the intake manifold 4 based on said model as a function of the mass $m_{obj}$ of combustion air needed by each cylinder 3 in order to fulfil the torque request $C_t^*$, of the actual inner volume V of each cylinder 3 and of the first group of reference quantities. The method further involves controlling the throttle valve 12 to obtain the objective pressure value $P_{OBJ}$ inside the intake manifold 4.

Finally, the method comprises detecting a first angular extent $VVT_I$ of the opening or closing difference relative to the reference values concerning the intake valve 5; acquiring the reference closing angle $IVC_{ref}$ of the intake valve 5; and determining the closing delay angle IVC of the intake valve 5 using the respective reference angle $IVC_{ref}$ and the first angular extent $VVT_I$. Furthermore, the method comprises detecting a second angular extent $VVT_E$ of the opening or closing difference relative to the reference values concerning the exhaust valve 7; acquiring the reference closing angle $EVC_{ref}$ of the exhaust valve 7; and determining the closing delay angle EVC of the exhaust valve 7 using the respective reference angle $EVC_{ref}$ and the second angular extent $VVT_E$.

The mass $M_{SCAV}$ of fresh air inside the intake manifold 4 directly directed towards the exhaust manifold 6 is calculated as the difference between the mass Move, flowing through the overlap and the residual mass $M_{EXH\_SCAV}$ of exhaust gases present inside the combustion chamber of the cylinder 3 and directly directed towards the exhaust manifold 6 through the respective exhaust valve 7.

In case the internal combustion engine 1 comprises the low-pressure exhaust gas recirculation circuit, the method comprises calculating the quantity $R_{EGR}$ and calculating the mass $M_{SCAV}$ of fresh air inside the intake manifold 4 directly directed towards the exhaust manifold 6 using the following formula:

$$M_{SCAV}=(M_{OVL}-M_{EXH\_SCAV})*(1-R_{EGR})$$

It is then possible to use the masses for each cylinder 3 and for each engine cycle in order to calculate the flow rates of the internal combustion engine 1, taking into account the number of cylinders 3 and the engine speed n (in particular, multiplying the number of cylinders 3 by the engine speed n multiplied by ½).

The description above explicitly relates to a supercharged internal combustion engine 1, but the strategy described herein can also find advantageous application in an internal combustion engine 1 which is not provided with a supercharging system.

The advantages of the model described herein are evident from the description above.

In particular, the model described herein represents a method that allows manufacturers to determine the mass m of air trapped in each cylinder 3, the total mass $M_{TOT}$ of air taken in by the internal combustion engine 1, the scavenging mass $M_{SCAV}$ and the inner EGR mass $M_{EGRI}$ in a manner that is deemed to be efficient (i.e. with an adequate precision), effective (i.e. quickly and without requiring an excessive calculation power for the electronic control unit 30) and economic (i.e. without requiring the installation of expensive additional components and/or sensors, such as for example the air flow meter).

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method to determine a mass (m) of air trapped in at least one cylinder of an internal combustion engine; wherein the internal combustion engine includes an intake manifold and an exhaust manifold, with a piston that is moveably supported in the at least one cylinder such that the piston and the at least one cylinder define a combustion chamber and wherein the at least one cylinder includes an intake valve that opens and closes and an exhaust valve that opens and closes such that the at least one cylinder is in fluid communication with the intake manifold from which the at least one cylinder receives an air/fuel mixture through the intake valve when the intake valve is open, and in fluid communication with the exhaust manifold into which the at least one cylinder introduces exhaust gases produced by combustion through the exhaust valve when the exhaust valve is open; wherein each intake of the air/fuel mixture into the at least one cylinder, each combustion of the air/fuel mixture in the combustion chamber and the exhaust gases from the at least one cylinder together define a work cycle and wherein the opening and closing of the intake valve and the exhaust valve are controlled so as to change the timing of their respective opening and closing; wherein the internal combustion engine is controlled by an electronic control unit which is electrically connected to an intake manifold temperature sensor which senses a temperature of the air/fuel mixture in the intake manifold and is electrically connected to an intake manifold pressure sensor that senses a pressure of the air/fuel mixture present in the intake manifold and is electrically connected to a rotational speed sensor which senses an angular position and, hence, a speed (n) of rotation of the internal combustion engine; the method comprising the steps of:

detecting the pressure of the air/fuel mixture inside the intake manifold using the intake manifold pressure sensor, detecting the speed (n) of rotation of the internal combustion engine using the rotational speed sensor and detecting a closing delay angle (IVC) of the intake valve associated with the cylinder;

determining a mass of gases produced by the combustion in a previous work cycle and present inside the at least one cylinder;

determining an inner volume (V) of the at least one cylinder as a function of the speed (n) of rotation of the internal combustion engine and of the closing delay angle (IVC) of the intake valve associated with the at least one cylinder; and determining the mass of air (m) trapped in the at least one cylinder through a product of a pressure (P) inside the intake manifold by the inner volume (V) of the at least one cylinder, from which the mass of gases is subtracted using a calculation model stored in the electronic control unit;

wherein the step of determining the mass of gases comprises the sub-steps of:

calculating a mass ($M_{OVL}$) of gases which flows, during an overlap phase in which the intake valve and the exhaust valve are simultaneously open, from an exhaust to an intake and which is re-sucked into the at least one cylinder, during the following intake phase, through the intake valve associated with the at least one cylinder using the following formula, in which the combustion chamber of the at least one cylinder represents a passage section:

$$M_{OVL} = S_{id} * \beta\left(\frac{P}{P_0}, n\right) * \frac{P_0}{P_{0\_REF}} * \sqrt{\frac{T_{0\_REF}}{T_0}} * \frac{1}{n}$$

where:
$S_{id}$ represents an area of the passage section;
n represents the speed of rotation (n) of the internal combustion engine;
$P_{0\_REF}$ represents a reference pressure in the exhaust manifold;
$T_{0\_REF}$ represents a reference temperature in the exhaust manifold;
$T_0$ represents a temperature in the exhaust manifold;
$P_0$ represents a pressure in the exhaust manifold;
P represents the pressure in the intake manifold;
wherein the area ($S_{id}$) of the passage section is calculated as a product between a first function (A) of the speed (n) of rotation of the internal combustion engine and of a duration (OVL) of the overlap phase and a second function of the speed (n) of rotation of the internal combustion engine and of an angular difference between a top dead center (PMS) and a center of gravity of the overlap phase; and calculating the mass of gases as a function of the mass ($M_{OVL}$) of gases to determine a quantity of fuel to be injected into said cylinder.

2. The method according to claim 1, wherein the electronic control unit is electrically connected to an exhaust gas pressure sensor that senses a pressure ($P_{EXH}$) of a gas flowing through the exhaust manifold and electrically connected to an exhaust gas temperature sensor that senses the temperature ($T_{EXH}$) of the gas flowing through the exhaust manifold, said method comprising the further steps of:

detecting the pressure ($P_{EXH}$) of the gas flowing through the exhaust manifold and detecting the temperature ($T_{EXH}$) of the gas flowing through the exhaust manifold;

calculating the mass OFF of gases using the following equation:

$$OFF = P_{EXH} * V_{CC}/R * T_{EXH} + M_{OVL}$$

$V_{CC}$ represents a dead volume of the combustion chamber of the cylinder;
R represents a constant of a mixture of fresh air and exhaust gases; and
$T_{EXH}$ represents the temperature the gas flow in the exhaust manifold.

3. The method according to claim 1 and comprising the further step of calculating the mass of gases, in case the pressure (P) inside the intake manifold is greater than a pressure ($P_{EXH}$) of a gas flow in the exhaust, using the following equation:

$$OFF = P_{EXH} * V_{CC}/(R * T_{EXH}) - M_{EXH\_SCAV}$$

where:
$V_{CC}$ represents a dead volume of the combustion chamber of the at least one cylinder;
$M_{EXH\_SCAV}$ represents a residual mass of exhaust gases present inside the combustion chamber and directed towards the exhaust manifold through the respective exhaust valve;
R represents a constant of the mixture of fresh air and exhaust gases; and
$T_{EXH}$ represents a temperature of the gas flow in the exhaust manifold.

4. The method according to claim 3, wherein the internal combustion engine includes a low-pressure exhaust gas recirculation circuit; the method includes the further steps of calculating a quantity ($R_{EGR}$) indicating the incidence of the low-pressure exhaust gas recirculation circuit on the fresh air/gas mixture flowing in an intake duct; and calculating the mass OFF of gases also as a function of said quantity ($R_{EGR}$) indicating the incidence of the low-pressure exhaust gas recirculation circuit.

5. The method according to claim 1, wherein the inner volume (V) of the cylinder is further calculated using a first map, which is a function of the closing delay angle (IVC) of the intake valve and of the speed (n) of rotation of the internal combustion engine, as well as using a second map, which is a function of the pressure (P) inside the intake manifold and of the speed (n) of rotation of the internal combustion engine.

6. The method according to claim 1, wherein the mass (m) of air trapped in the at least one cylinder is multiplied by a first factor, which is a function of a temperature (T) inside the intake manifold and of the pressure (P) inside the intake manifold, and by a second factor, which is a function of a temperature ($T_{H2O}$) of a coolant fluid of the internal combustion engine and of the pressure (P) inside the intake manifold.

7. The method according to claim 1, wherein the mass (m) of air trapped in the at least one cylinder is calculated as a function of a first multiplying coefficient ($K_1$) and a second multiplying coefficient ($K_2$), which take into account an angular extent ($VVT_I$) of a difference relative to reference values of the intake valve, an angular extent ($VVT_E$) of a difference relative to the reference values of the exhaust valve and the speed (n) of rotation of the internal combustion engine.

8. The method according to claim 7, wherein the mass (m) of air trapped in the at least one cylinder is calculated as a function of the first multiplying coefficient ($K_1$), which takes into account the angular extent ($VVT_I$) of the difference relative to the reference values of the intake valve and the angular extent ($VVT_E$) of the difference relative to the reference values of the exhaust valve, and of the second multiplying coefficient ($K_2$), which takes into account the speed (n) of rotation of the internal combustion engine and the angular extent ($VVT_E$) of the difference relative to the reference values of the exhaust valve.

9. The method according to claim 1, wherein the internal combustion engine further includes an EGR exhaust gas recirculation circuit ($EGR_{LP}$, $EGR_{HP}$), which includes, in turn, a bypass duct; wherein along the bypass duct there is arranged an EGR valve, which adjusts a flow rate of the exhaust gases flowing through the bypass duct; the method further includes the step of determining the mass (m) of air trapped in the at least one cylinder as a function of a mass ($M_{EGR}$) recirculated through the EGR exhaust gas recirculation circuit ($EGR_{LP}$, $EGR_{HP}$) for the at least one cylinder.

10. The method according to claim 1, wherein a dead volume ($V_{CC}$) of the combustion chamber of the at least one cylinder is a function of the speed (n) of rotation of the internal combustion engine and of a first parameter (TVC), which is equal to a closing delay angle (EVC) of the exhaust valve.

11. The method according to claim 1, wherein a volume ($V_{CC}$) of the combustion chamber is determined using a third map, which is a function of the speed (n) of rotation of the internal combustion engine and of a first parameter (TVC), which is equal to a closing delay angle (EVC) of the exhaust valve.

12. The method according to claim 1 and comprising the further steps of:
determining, based on a calculation model using measured and/or estimated physical quantities, a mass ($m_{obj}$) of combustion air needed by the at least one cylinder in order to fulfill a torque request ($C_t^*$); and
determining an objective pressure value ($P_{OBJ}$) inside the intake manifold based on said calculation model as a function of the mass ($m_{obj}$) of combustion air needed by the at least one cylinder in order to fulfill the torque request ($C_t^*$), of the inner volume (V) of the at least one cylinder and of a first group of reference quantities.

13. The method according to claim 12, wherein the internal combustion engine includes a valve, which is designed to adjust a flow rate of a gas mixture comprising both exhaust gases and fresh air through an intake duct, directed towards the intake manifold; the method further including the step of controlling said valve so as to obtain the objective pressure value ($P_{OBJ}$) inside the intake manifold.

14. The method according to claim 1 and comprising the further step of calculating a mass ($M_{SCAV}$) of fresh air inside the intake manifold directed towards the exhaust manifold by using the difference between the mass ($M_{OVL}$) of gases which flows, during the overlap phase in which the intake valve and the exhaust valve are simultaneously open, and a residual mass ($M_{EXH\_SCAV}$) of exhaust gases present inside the combustion chamber and directed towards the exhaust manifold through the at least one respective exhaust valve.

15. The method according to claim 1, wherein a dead volume ($V_{CC}$) of the combustion chamber is determined as a function of the speed (n) of rotation of the internal combustion engine and of a first parameter (TVC), which is equal to a greatest value between zero and the smallest value between a closing delay angle (EVC) of the exhaust valve and a value of an opening advance angle (IVO) of the intake valve multiplied by −1.

16. The method according to claim 1, wherein a volume ($V_{CC}$) of the combustion chamber is determined using a third map, which is a function of the speed (n) of rotation of the internal combustion engine and of a first parameter (TVC), which is equal to a greatest value between zero and the smallest value between a closing delay angle (EVC) of the exhaust valve and a value of an opening advance angle (IVO) of the intake valve multiplied by −1, and using a fourth map, which is a function of the speed (n) of rotation of the internal combustion engine and of the duration of the overlap phase (OVL).

17. The method according to claim 1 and comprising the further steps of:
determining a pressure ($P_{EXH}$) of a gas flowing through the exhaust manifold using a first model and determining a temperature ($T_{EXH}$) of the gas flowing through the exhaust manifold using a second model;
calculating the mass OFF of gases using the following equation:

$$OFF = P_{EXH} * V_{CC}/R * T_{EXH} + M_{OVL}$$

$V_{CC}$ represents a dead volume of the combustion chamber of the cylinder;
R represents a constant of a mixture of fresh air and exhaust gases; and
$T_{EXH}$ represents the temperature the gas flow in the exhaust manifold.

18. A method to determine a mass (m) of air trapped in at least one cylinder of an internal combustion engine; wherein the internal combustion engine includes an intake manifold and an exhaust manifold, a piston that is moveably supported in the at least one cylinder such that the piston and the at least one cylinder define a combustion chamber and wherein the at least one cylinder includes an intake valve that opens and closes and an exhaust valve that opens and closes such that the at least one cylinder is in fluid communication with the intake manifold from which the at least one cylinder receives an air/fuel mixture through the intake valve when the intake valve is open, and in fluid communication with the exhaust manifold into which the at last one cylinder introduces exhaust gases produced by combustion through the exhaust valve when the exhaust valve is open; wherein each intake of the air/fuel mixture into the at least one cylinder, each combustion of the air/fuel mixture in the combustion chamber and the exhaust gases from the at least one cylinder together define a work cycle and wherein the opening and closing of the intake valve is controlled so as to change the timing of the opening and closing; wherein the internal combustion engine is controlled by an electronic control unit which is electrically connected to an intake manifold temperature sensor which senses a temperature of the air/fuel mixture in the intake manifold and is electrically connected to an intake manifold pressure sensor that senses a pressure of the air/fuel mixture present in the intake manifold and electrically connected to a rotational speed sensor which senses the angular position and, hence, the speed (n) of rotation of the internal combustion engine; the method comprises the steps of:
detecting the pressure of the air/fuel mixture inside the intake manifold using the intake manifold pressure sensor, detecting the speed (n) of rotation of the internal combustion engine using the rotational speed sensor and detecting a closing delay angle (IVC) of the intake valve associated with the at least one cylinder;
determining a mass of gases produced by the combustion in a previous work cycle and present inside the at least one cylinder;
determining an inner volume (V) of the cylinder as a function of the speed (n) of rotation of the internal combustion engine and of the closing delay angle (IVC) of the intake valve associated with the at least one cylinder; and determining the mass of air (m) trapped in the at least one cylinder through a product of a pressure (P) inside the intake manifold by the inner volume (V) of the at least one cylinder, from which the mass of gases is subtracted using a calculation model stored in the electronic control unit;

wherein the step of determining the mass of gases comprises the sub-steps of:

calculating a mass ($M_{OVL}$) of gases which flows, during an overlap phase in which the intake valve and the exhaust valve are simultaneously open, from an exhaust to an intake and which is re-sucked into the at least one cylinder, during the following intake phase, through the respective intake valve associated with the at least one cylinder using the following formula, in which the combustion chamber represents a passage section:

$$M_{OVL} = S_{id} * \beta\left(\frac{P}{P_0}, n\right) * \frac{P_0}{P_{0\_REF}} * \sqrt{\frac{T_{0\_REF}}{T_0}} * \frac{1}{n}$$

where:

$S_{id}$ represents an area of the passage section;

n represents the speed of rotation (n) of the internal combustion engine;

$P_{0\_REF}$ represents a reference pressure in the exhaust manifold;

$T_{0\_REF}$ represents a reference temperature in the exhaust manifold;

$T_0$ represents a temperature in the exhaust manifold;

$P_0$ represents a pressure in the exhaust manifold;

P represents the pressure in the intake manifold;

wherein the area ($S_{id}$) of the passage section is calculated as a product between a first function (A) of the speed (n) of rotation of the internal combustion engine and of a duration (OVL) of the overlap phase and a second function of the speed (n) of rotation of the internal combustion engine and of an angular difference between a top dead center (PMS) and a center of gravity of the overlap phase; and calculating the mass of gases as a function of the mass ($M_{OVL}$) of gases to determine a quantity of fuel to be injected into said cylinder.

19. A method to determine a mass (m) of air trapped in at least one cylinder of an internal combustion engine; wherein the internal combustion engine includes an intake manifold and an exhaust manifold, a piston that is moveably supported in the at least one cylinder such that the piston and the at least one cylinder define a combustion chamber and wherein the at least one cylinder includes an intake valve that opens and closes and an exhaust valve that opens and closes such that the at least one cylinder is in fluid communication with the intake manifold from which the at least one cylinder receives an air/fuel mixture through the intake valve when the intake valve is open, and in fluid communication with the exhaust manifold into which the at least one cylinder introduces exhaust gases produced by combustion through the exhaust valve when the exhaust valve is open; wherein each intake of the air/fuel mixture into the at least one cylinder, each combustion of the air/fuel mixture in the combustion chamber and the exhaust gases from the at least one cylinder together define a work cycle and wherein the opening and closing of the exhaust valve is controlled so as to change the timing of opening and closing the exhaust valve; wherein the internal combustion engine is controlled by an electronic control unit which is electrically connected to an intake manifold temperature sensor which senses a temperature of the air/fuel mixture in the intake manifold and is electrically connected to an intake manifold pressure sensor that senses a pressure of the air/fuel mixture present in the intake manifold and electrically connected to a rotational speed sensor which senses the angular position and, hence, the speed (n) of rotation of the internal combustion engine; the method comprises the steps of:

detecting the pressure of the air/fuel mixture inside the intake manifold using the intake manifold pressure sensor, detecting the speed (n) of rotation of the internal combustion engine using the rotational speed sensor and detecting a closing delay angle (IVC) of the intake valve associated with the at least one cylinder;

determining a mass of gases produced by the combustion in a previous work cycle and present inside the at least one cylinder;

determining an inner volume (V) of the at least one cylinder as a function of the speed (n) of rotation of the internal combustion engine and of the closing delay angle (IVC) of the intake valve associated with the at least one cylinder; and determining the mass of air (m) trapped in the at least one cylinder through a product of a pressure (P) inside the intake manifold by the inner volume (V) of the at least one cylinder, from which the mass of gases is subtracted using a calculation model stored in the electronic control unit;

wherein the step of determining the mass of gases comprises the sub-steps of:

calculating a mass ($M_{OVL}$) of gases which flows, during an overlap phase in which the intake valve and the exhaust valve are simultaneously open, from an exhaust to an intake and which is re-sucked into the at least one cylinder, during the following intake phase, through the intake valve associated with the at least one cylinder using the following formula, in which the combustion chamber of the cylinder represents a passage section:

$$M_{OVL} = S_{id} * \beta\left(\frac{P}{P_0}, n\right) * \frac{P_0}{P_{0\_REF}} * \sqrt{\frac{T_{0\_REF}}{T_0}} * \frac{1}{n}$$

where:

$S_{id}$ represents an area of the passage section;

n represents the speed of rotation (n) of the internal combustion engine;

$P_{0\_REF}$ represents a reference pressure in the exhaust manifold;

$T_{0\_REF}$ represents a reference temperature in the exhaust manifold;

$T_0$ represents a temperature in the exhaust manifold;

$P_0$ represents a pressure in the exhaust manifold;

P represents the pressure in the intake manifold;

wherein the area ($S_{id}$) of the passage section is calculated as a product between a first function (A) of the speed (n) of rotation of the internal combustion engine and of a duration (OVL) of the overlap phase and a second function of the speed (n) of rotation of the internal combustion engine and of an angular difference between a top dead center (PMS) and a center of gravity of the overlap phase; and calculating the mass of gases as a function of the mass ($M_{OVL}$) of gases to determine a quantity of fuel to be injected into the at least one cylinder.

20. A method to determine a mass (m) of air trapped in at least one cylinder of an internal combustion engine; wherein the internal combustion engine includes an intake manifold and an exhaust manifold, a piston that is moveably supported in the at least one cylinder such that the piston and the at least one cylinder define a combustion chamber and wherein the at least one cylinder includes an intake valve that opens and closes and an exhaust valve that opens and closes such that the at least one cylinder is in fluid communication with the intake manifold from which the at least one cylinder receives an air/fuel mixture through the intake valve when the intake valve is open, and in fluid communication with the exhaust manifold into which the at least one cylinder introduces exhaust gases produced by combustion through the exhaust valve when the exhaust valve is open; wherein each intake of the air/fuel mixture into the at least one cylinder, each combustion of the air/fuel mixture in the combustion chamber and the exhaust gases from the at least one cylinder together define a work cycle and wherein the opening and closing of the intake valve and/or of the exhaust valve are controlled so as to change the timing of their respective opening and closing; wherein the internal combustion engine is controlled by an electronic control unit which is electrically connected to an intake manifold temperature sensor which senses a temperature of the air/fuel mixture in the intake manifold and is electrically connected to an intake manifold pressure sensor that senses a pressure of the air/fuel mixture present in the intake manifold and electrically connected to a rotational speed sensor which senses the angular position and, hence, the speed (n) of rotation of the internal combustion engine; the method comprises the steps of:

detecting a pressure of the air/fuel mixture inside the intake manifold using the intake manifold pressure sensor, detecting the speed (n) of rotation of the internal combustion engine using the rotational speed sensor and detecting a closing delay angle (IVC) of the intake valve associated with the at least one cylinder;

determining a mass of gases produced by the combustion in a previous work cycle and present inside the at least one cylinder;

determining an inner volume (V) of the at least one cylinder as a function of the speed (n) of rotation of the internal combustion engine and of the closing delay angle (IVC) of the intake valve associated with the at least one cylinder; and determining the mass of air (m) trapped in the at least one cylinder through a product of a pressure (P) inside the intake manifold by the inner volume (V) of the at least one cylinder, from which the mass of gases is subtracted using a calculation model stored in the electronic control unit;

wherein the step of determining the mass of gases comprises the sub-steps of:

calculating a mass ($M_{OVL}$) of gases which flows, during an overlap phase in which the intake valve and the exhaust valve are simultaneously open, from an exhaust to an intake and which is re-sucked into the at least one cylinder, during the following intake phase, through the intake valve associated with the at least one cylinder using the following formula, in which the combustion chamber of the at least one cylinder represents a passage section:

$$M_{OVL} = S_{id} * \beta\left(\frac{P}{P_{EXH}}, n\right) * \frac{P_{EXH}}{P_{0\_REF}} * \sqrt{\frac{T_{0\_REF}}{T_{EXH}}} * \frac{1}{n}$$

where:

$S_{id}$ represents an area of the passage section;

n represents the speed of rotation (n) of the internal combustion engine;

$P_{0\_REF}$ represents a reference pressure in the exhaust manifold;

$T_{0\_REF}$ represents a reference temperature in the exhaust manifold;

$T_{EXH}$ represents a temperature of a gas flow in the exhaust manifold;

$P_{EXH}$ represents a pressure of a gas flow in the exhaust manifold;

P represents the pressure in the intake manifold;

wherein the area ($S_{id}$) of the passage section is calculated as a product between a first function (A) of the speed (n) of rotation of the internal combustion engine and of a duration (OVL) of the overlap phase and a second function of the speed (n) of rotation of the internal combustion engine and of an angular difference between a top dead center (PMS) and a center of gravity of the overlap phase; and calculating the mass of gases as a function of the mass ($M_{OVL}$) of gases to determine a quantity of fuel to be injected into the at least one cylinder.

* * * * *